(12) United States Patent
Kim et al.

(10) Patent No.: US 7,031,046 B2
(45) Date of Patent: *Apr. 18, 2006

(54) VARIABLE FOCAL LENGTH LENS COMPRISING MICROMIRRORS WITH TWO DEGREES OF FREEDOM ROTATION

(75) Inventors: Tae Hyeon Kim, Taejeon (KR); Sang Hyune Baek, Suwon (KR)

(73) Assignees: Angstrom Inc., Suwon (KR); Stereo Display Inc., Fullerton, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/855,715

(22) Filed: May 27, 2004

(65) Prior Publication Data
US 2005/0275927 A1    Dec. 15, 2005

(51) Int. Cl.
*G02B 26/00* (2006.01)
(52) U.S. Cl. ..................................... 359/291; 359/846
(58) Field of Classification Search ................. 359/846, 359/291
See application file for complete search history.

(56) References Cited

U.S. PATENT DOCUMENTS

| 2,002,376 | A |  | 5/1935 | Mannheimer |  |
|---|---|---|---|---|---|
| 4,834,512 | A |  | 5/1989 | Austin |  |
| 5,986,811 | A | * | 11/1999 | Wohlstadter | ................ 359/626 |
| 6,111,900 | A |  | 8/2000 | Suzudo |  |
| 6,658,208 | B1 | * | 12/2003 | Watanabe et al. | ............. 396/89 |
| 6,784,771 | B1 | * | 8/2004 | Fan | ............................... 335/78 |
| 6,833,938 | B1 | * | 12/2004 | Nishioka | ...................... 359/15 |
| 2002/0102102 | A1 |  | 8/2002 | Watanabe et al. |  |
| 2005/0057812 | A1 | * | 3/2005 | Raber | ......................... 359/619 |

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.
Cho, 2003, "Fast-response Variable Focusing Micromirror Array Lens," Proceeding of SPIE vol. 5055: 278-286.

* cited by examiner

*Primary Examiner*—Scott J. Sugarman
*Assistant Examiner*—Richard Hanig
(74) *Attorney, Agent, or Firm*—Park Law Firm; John K. Park

(57) ABSTRACT

A micromirror array lens consists of many micromirrors with two degrees of freedom rotation and actuating components. As a reflective variable focal length lens, the array of micromirrors makes all lights scattered from one point of an object converge at one point of image plane. As operational methods for the lens, the actuating components control the positions of micromirrors electrostatically and/or electromagnetically. The optical efficiency of the micromirror array lens is increased by locating a mechanical structure upholding micromirrors and the actuating components under micromirrors. The known semiconductor microelectronics technologies can remove the loss in effective reflective area due to electrode pads and wires. Independent control of each micromirror is possible by known semiconductor microelectronics technologies. The micromirror array can form a lens with arbitrary shape and/or size, as desired.

25 Claims, 5 Drawing Sheets

VARIABLE FOCAL LENGTH LENS COMPRISING MICROMIRRORS WITH TWO DEGREES OF FREEDOM ROTATION

BACKGROUND OF THE INVENTION

The present invention relates to a variable focal length lens comprising micromirrors with two degrees of freedom (DOF) rotation.

A most widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids. Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278–286. The paper is incorporated by reference into this disclosure as if fully set forth herein. The micromirror array lens mainly consists of micromirrors and actuating components, and uses a much simpler mechanism to control the focusing system than a liquid crystal variable focal length lens. The focal length of the micromirror array lens is varied with the displacement of each micromirror. But, the paper only describes basic idea related to design and control. Applying the micromirrors with two DOF rotations only, this invention improves the design and control of the micromirror array lens. This invention extends advantages and applications of the lens.

SUMMARY OF THE INVENTION

The present invention contrives to solve the disadvantages of the conventional variable focal length lens.

The objective of the invention is to improve the design and control of the micromirror array lens. The invention extends advantages and applications of the lens.

Conventional micromirror array lens is described in J. Boyd and G. Cho, 2003, "Fast-response Variable Focusing Micromirror Array Lens," *Proceeding of SPIE* Vol. 5055: 278–286. The lens works as a variable focal length lens, and consists of many micromirrors to reflect the light and actuating components to control positions of the micromirrors. Each micromirror has the same function as a mirror. By making all light scattered from one point of an object have the same periodical phase and converge at one point of image plane, the conventional micromirror array works as a reflective focal length lens. In order to do this, the micromirrors are electrostatically controlled to have desired positions by actuating components. A diffraction-limited micromirror array lens is formed by controlling both one degree of freedom (DOF) translation and one degree of freedom (DOF) rotation of each micromirror. The micromirror with both one DOF translation and one DOF rotation has a complex mechanical structure, actuating components and coupled motion. Therefore, fabrication, accurate control and large displacements of the micromirror are difficult.

Another type of micromirror array lens with one DOF rotation of micromirrors has a much simple mechanical structure and actuating components. The micromirror array lens formed by the control of one DOF rotation has relatively larger aberration because the same phase condition is not satisfied. Even though the quality of the lens formed by control of one DOF rotation is lower than that of the lens formed by control of both one DOF rotation and one DOF translation, it can be used as a variable focal length lens such as an imaging lens with low quality or focusing lens because of advantages which its structure and control is much simpler than those of the lens formed by control of both one DOF rotation and one DOF translation.

This invention proposed the array comprising micromirrors with two degree of freedom rotations which are controlled independently. Independent control of each micromirror is possible by replacing electric circuits required for control with known MOS or CMOS technologies and fabricating the circuits underneath the micromirrors using known microfabrication methods. The micromirrors can make a lens with an arbitrary shape and/or size, as desired. Incident lights can be modulated arbitrarily by forming arbitrary shape and/or size of a lens. To do this, it is required that incident lights are deflected to desired arbitrary directions by controls of two degree of freedom rotations.

The micromirror array lens can be formed by a polar array of the micromirrors. For the polar array, each micromirror has a fan shape to increase an effective reflective area, so that the optical efficiency increases. The aberration of the micromirror array lens can be reduced by micromirrors with curvatures. The optical efficiency of the micromirror array lens can be improved by locating a mechanical structure upholding micromirrors and the actuating components under micromirrors to increase an effective reflective area. Electric circuits to operate the micromirrors can be replaced with known semiconductor microelectronics technologies such as MOS and CMOS. Applying the microelectronics circuits under the micromirror array, the effective reflective area can be increased by removing necessary area for electrode pads and wires.

The advantages of the present invention are: (1) the lens can have arbitrary shape and/or size, as desired; (2) the micromirror array lens has a very fast response time because each micromirror has a tiny mass; (3) the lens has a large focal length variation because a large numerical aperture variation can be achieved by increasing the maximum rotational angle of the micromirror; (4) the lens can have a large size aperture without losing optical performance. Because the micromirror array lens consists of discrete micromirrors, the increasing of the lens size does not cause the increasing of aberration caused by shape error of a lens; (5) the lens has a low cost because of the advantages of its mass productivity; (6) the lens makes the focusing system much simple;

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
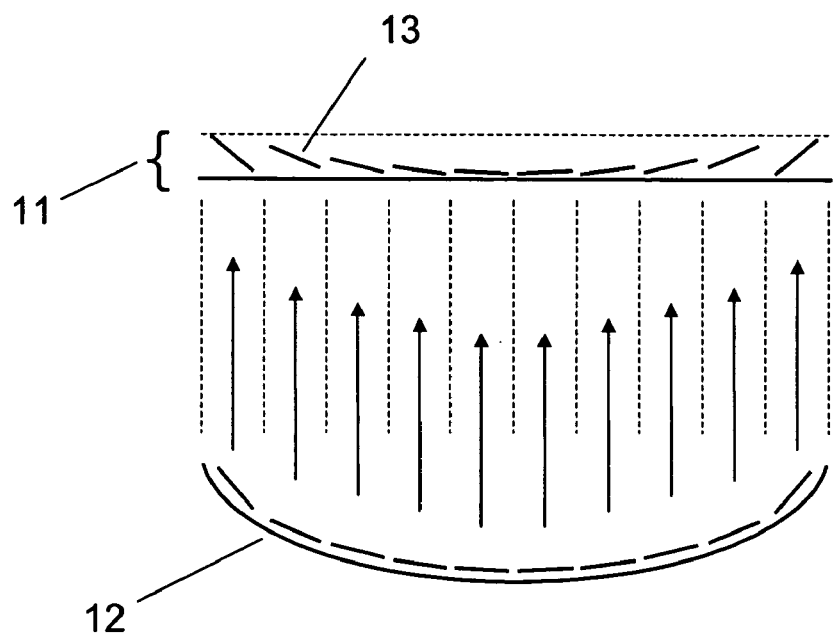
FIG. 1 is a schematic diagram showing the cut-away side view of a conventional micromirror array lens.

FIG. 1 illustrates the principle of a conventional micromirror array lens 11. There are two conditions to make a perfect lens. The first is the converging condition that all light scattered by one point of an object should converge into one point of the image plane. The second is the same phase condition that all converging light should have the same phase at the image plane. To satisfy the perfect lens conditions, the surface shape of conventional reflective lens 12 is formed to have all light scattered by one point of an objective to be converged into one point of the image plane and have the optical path length of all converging light to be same.

A micromirror array arranged in flat plane can satisfy two conditions to be a lens. Each of the micromirrors 13 rotates to converge the scattered light. Because all micromirrors 13 of the micromirror array lens 11 are arranged in a flat plane as shown in FIG. 1, the optical path length of lights converged by rotation of the micromirrors is different. Even though the optical path length of converging light is different, the same phase condition can be satisfied by adjusting the phase because the phase of light is periodic.

Figure 2:
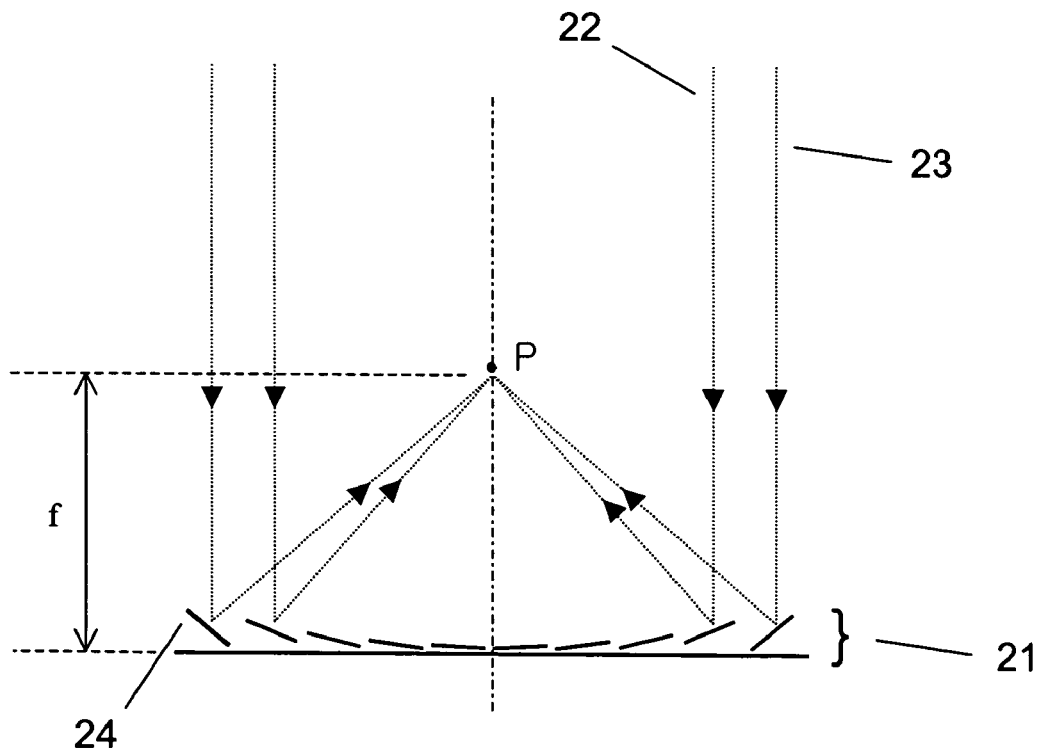
FIG. 2 is a schematic diagram showing how a micromirror array lens comprising micromirrors with two DOF rotation works as a lens.

FIG. 2 illustrates how the micromirror array lens 21 comprising micromirrors with two DOF rotation images. Arbitrary scattered lights 22, 23 are converged into one point P of the image plane by controlling the positions of the micromirrors 24. The phases of arbitrary light 22, 23 are not adjusted to satisfy the same phase condition. Even though the phase condition is not satisfied, low quality imaging or focusing is still possible.

It is desired that each of the micromirrors 24 has a curvature because the ideal shape of a conventional reflective lens 12 has a curvature. According to focal length change of the lens, the curvature of micromirror should be controlled. The curvature of the micromirror is controlled by known electrothermal or electrostatic force. If the size of the flat micromirror is small enough, the aberration of the lens comprising flat micromirrors 24 is also small enough. In this case, the micromirror does not need a curvature. The focal length f of the micromirror array lens 21 is changed by controlling the two DOF rotation of each micromirror 24.

Figure 3:
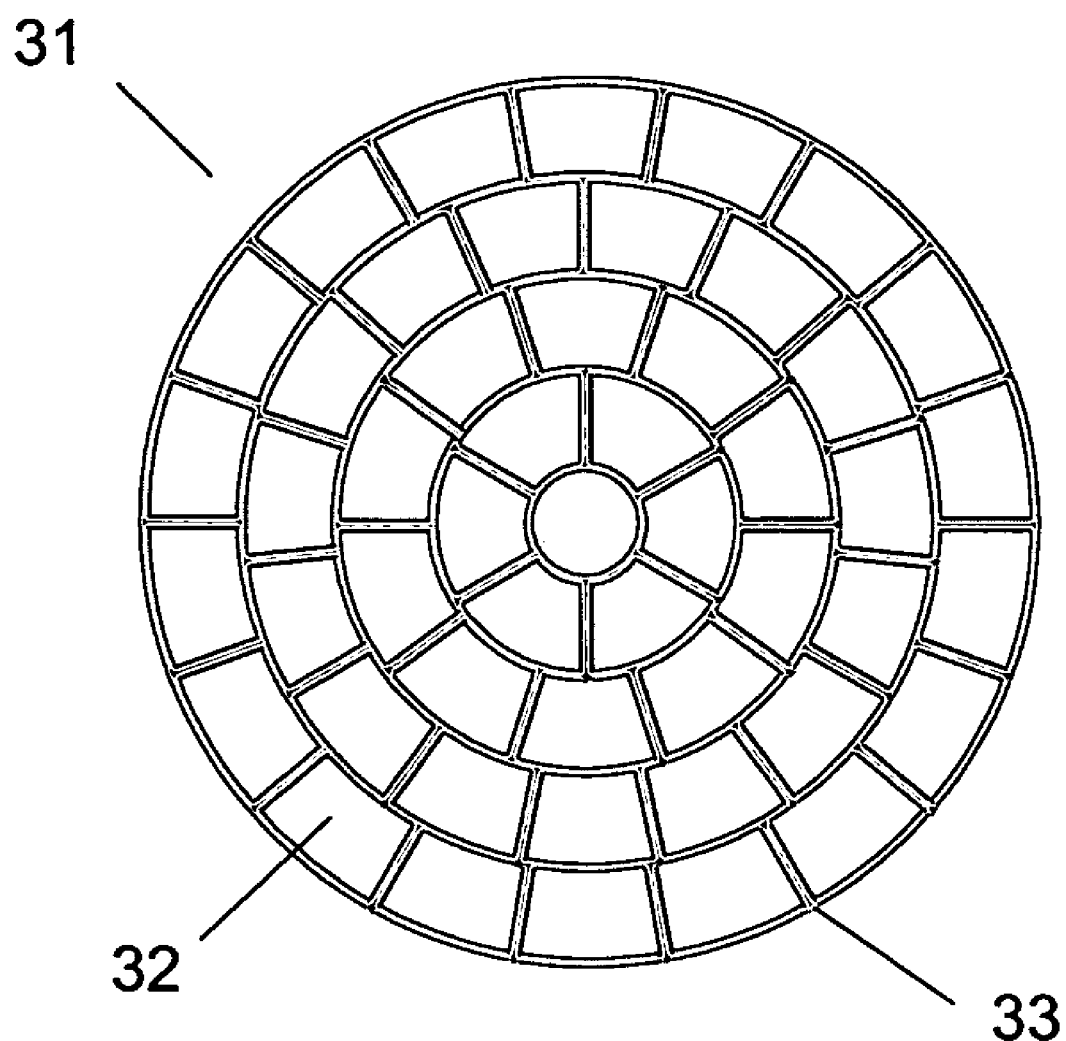
FIG. 3 is an in-plane schematic view showing one of the structures of the micromirror array lens that is made of many micromirrors and actuating components.

FIG. 3 illustrates the in-plane view of a circular micromirror array lens 31. The micromirror 32 has the same function as a mirror. Therefore, the reflective surface of the micromirror 32 is made of metal, metal compound, multi-layered dielectric materials, or other materials that have high reflectivity. Many known microfabrication processes can make the surface with high reflectivity. Each micromirror 32 is electrostatically and/or electromagnetically controlled by the actuating components 33 as known. In case of an axisymmetric lens, the micromirror array lens 31 has a polar array of the micromirrors 32. Each of the micromirrors 32 has a fan shape to increase an effective reflective area, which increases optical efficiency. All micromirrors are arranged in a flat plane because they are fabricated by known microfabrication processes. The micromirrors are arranged to form one or more concentric circles to form the axisymmetric lens and the micromirrors on same concentric circle can be controlled by the same electrodes with concentric circle shape or by the individual electrodes independently.

The mechanical structure upholding each reflective micromirror 32 and the actuating components 33 are located under the micromirrors 32 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires, which are used to supply actuating power.

Figure 4:
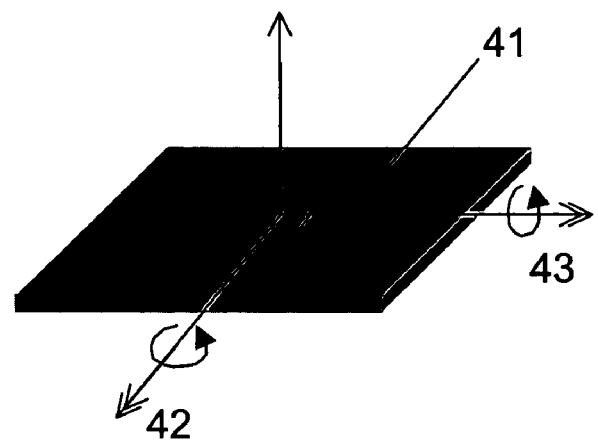
FIG. 4 is a schematic diagram showing two rotational axes of the micromirror.

FIG. 4 shows two DOF rotation of the micromirror 41. The array comprising micromirrors 41 with two DOF rotation 42, 43 which are controlled independently can make a lens with arbitrary shape and/or size, as desired. Incident lights can be modulated arbitrarily by forming an arbitrary shape and/or size lens. To do this, it is required that incident lights are deflected to desired arbitrary directions by controls of two degree of freedom rotations 42, 43.

Figure 5A:
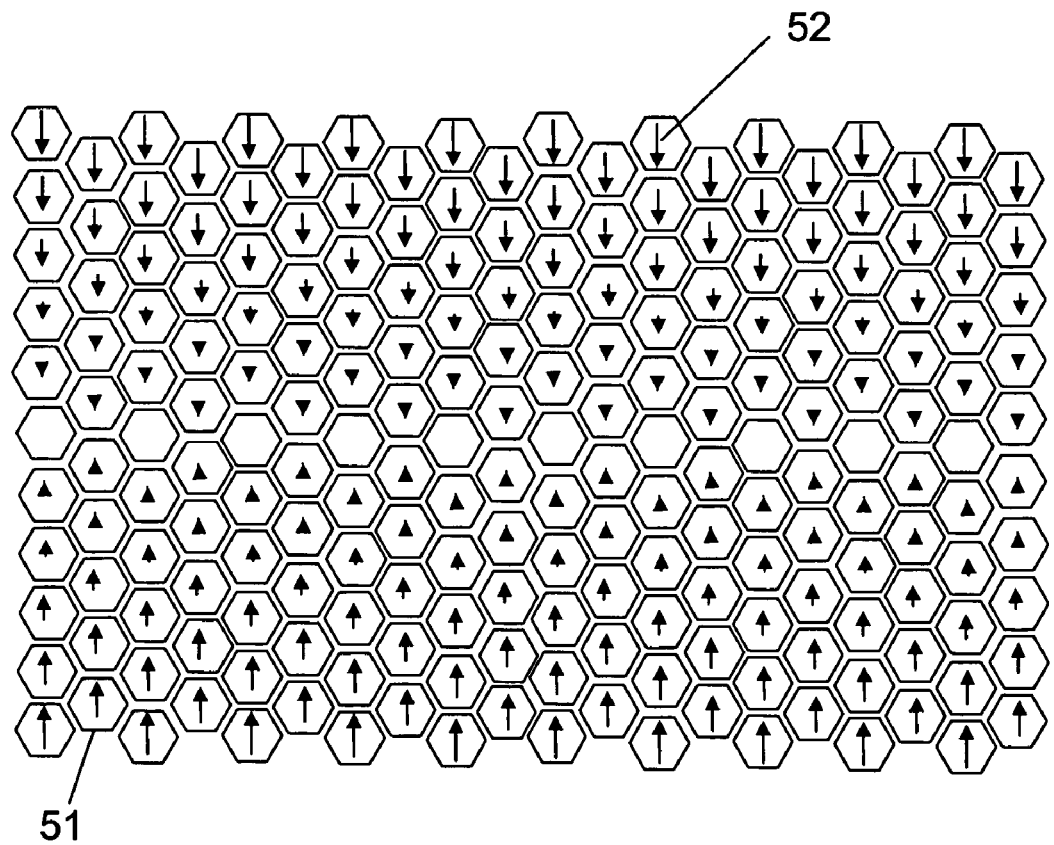
FIGS. 5a–5b are schematic diagrams showing the lenses comprising hexagonal micromirrors.
Figure 5B:
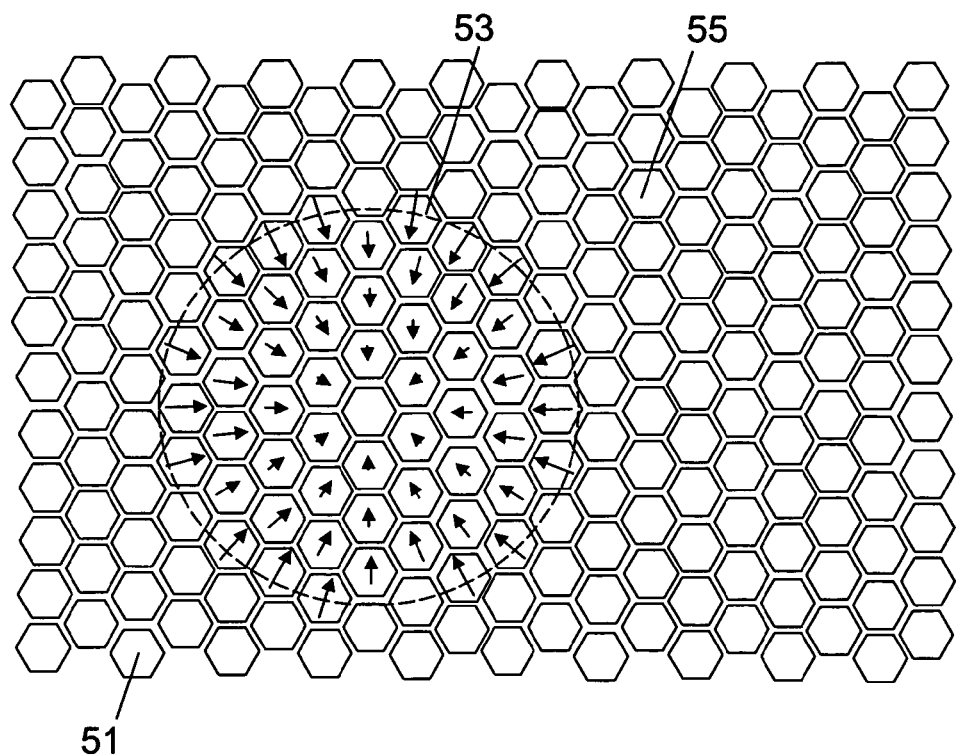
Figure 6:
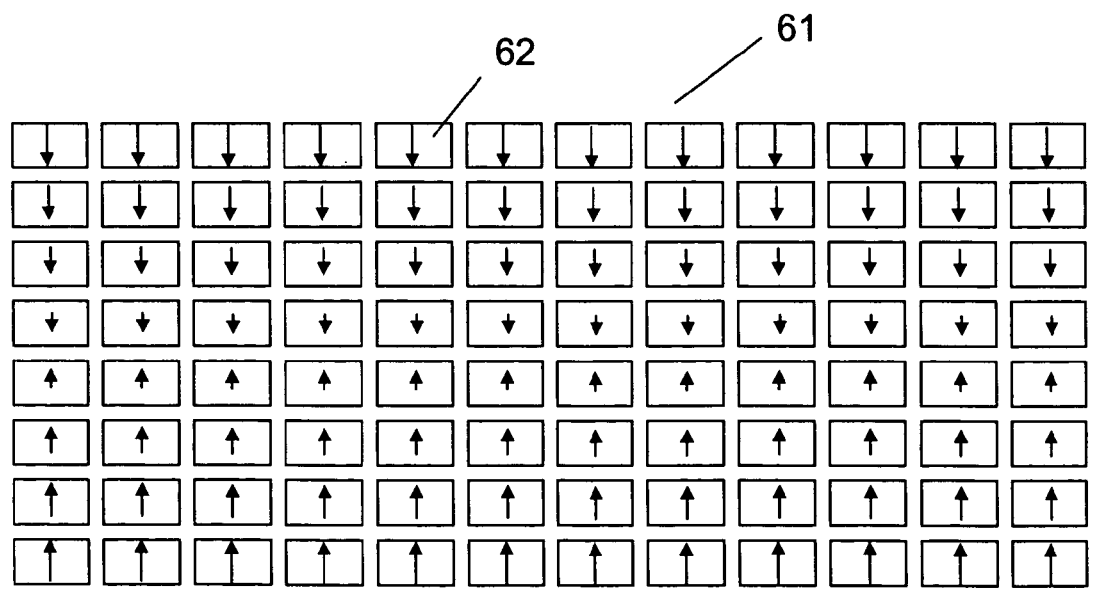
FIG. 6 is a schematic diagram showing the cylindrical lens comprising rectangular micromirrors.
Figure 7:
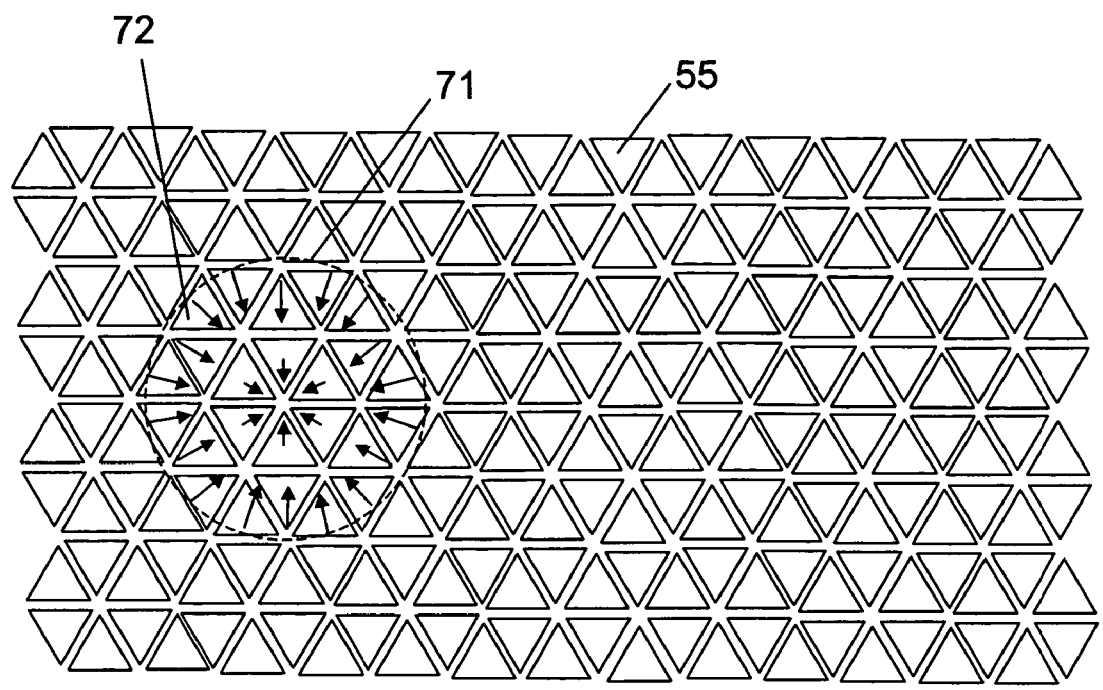
FIG. 7 is a schematic diagram showing the circular lens comprising triangular micromirrors.

In FIGS. 5a, 5b, 6 and 7, the rotation amount of the micromirror is represented by length of arrow 52 and the rotational direction of the micromirror is represented by direction of arrow 52. FIG. 5a shows a variable focal length cylindrical lens comprising hexagonal micromirrors 51. FIG. 5b shows a variable focal length circular lens 53 comprising hexagonal micromirrors 51. Shape, position and size of the variable focal length circular lens 53 can be changed by independent control of micromirrors 51 with two rotations. In FIGS. 5b and 7, micromirrors 55 which are not elements of the lens are controlled to make lights reflected by the micromirrors 55 have no influence on imaging or focusing.

Even though FIGS. 5a–5b show hexagonal micromirrors 51, fan shape, rectangle, square, or triangle micromirrors array can be used. An array comprising fan shape micromirrors is appropriate to an axisymmetric lens. FIG. 6 shows a variable focal length cylindrical lens 61 comprising rectangular micromirrors 62. An array comprising square or rectangle micromirrors 62 is appropriate to a symmetric lens about one in-plane axis such as cylindrical lens 61. Micromirrors with same rotation can be controlled by same electrode or individual electrodes independently. FIG. 7 shows a variable focal length circular lens 71 comprising triangular micromirrors 72. An array comprising triangular micromirrors 72 is appropriate to a lens with arbitrary shape and/or size like an array comprising hexagonal micromirrors.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of micromirrors with two degrees of freedom rotation, wherein the rotation of micromirrors is controlled to change the focal length of the lens.

2. The lens of claim 1, wherein all of the micromirrors are arranged in a flat plane.

3. The lens of claim 1, wherein the micromirrors are arranged to form one or more concentric circles to form the lens.

4. The lens of claim 3, wherein the micromirrors on each of the concentric circles are controlled by one or more electrodes corresponding to the concentric circle.

5. The lens of claim 1, wherein the micromirrors with same displacements are controlled by same electrode.

6. The lens of claim 1, wherein the micromirror has a fan shape.

7. The lens of claim 1, wherein the micromirror have a hexagonal shape.

8. The lens of claim 1, wherein the micromirror has a rectangular shape.

9. The lens of claim 1, wherein the micromirror has a square shape.

10. The lens of claim 1, wherein the micromirror has a triangle shape.

11. The lens of claim 1, wherein the reflective surface of the micromirror is substantially flat.

12. The lens of claim 1, wherein a control circuitry is constructed under the micromirrors by using semiconductor microelectronics technologies.

13. The lens of claim 1, wherein the micromirrors are actuated by electrostatic force.

14. The lens of claim 1, wherein the micromirrors are actuated by electromagnetic force.

15. The lens of claim 1, wherein the micromirrors are actuated by electrostatic force and electromagnetic force.

16. The lens of claim 1, wherein a mechanical structure upholding the micromirrors and actuating components are located under the micromirrors.

17. The lens of claim 1, wherein the micromirrors are controlled independently.

18. The lens of claim 1, wherein the reflective surface of the micromirror has a curvature.

19. The lens of claim 18, wherein curvatures of the micromirrors are controlled.

20. The lens of claim 19, wherein the curvatures of the micromirrors are controlled by electrothermal force.

21. The lens of claim 19, wherein the curvatures of the micromirrors are controlled by electrostatic force.

22. The lens of claim 1, wherein the surface material of the micromirror is the one with high reflectivity.

23. The lens of claim 1, wherein the surface material of the micromirror is metal.

24. The lens of claim 1, wherein the surface material of the micromirror is metal compound.

25. The lens of claim 1, wherein the surface of the micromirror is made of multi-layered dielectric material.

* * * * *